(12) United States Patent
Wulf et al.

(10) Patent No.: US 6,365,315 B1
(45) Date of Patent: Apr. 2, 2002

(54) MANUFACTURING METHODS, BASED ON NON AQUEOUS DISPERSION TECHNIQUES, TO PRODUCE SPHERICAL POLYESTER PARTICLE SIZE DISTRIBUTIONS AND TAILORABLE MEAN PARTICLE SIZES

(75) Inventors: Stefan Wulf, Mönchengladbach; Alexandra Jacobs, Niedernhausen; Volker Mörs, Frankfurt, all of (DE); Toshio Shiwaku, Fuji (JP); Benett Clayton Ward, Denver, NC (US)

(73) Assignee: Ticona GmbH (DE)

( * ) Notice: Subject to any disclaimer, the term of this patent is extended or adjusted under 35 U.S.C. 154(b) by 0 days.

(21) Appl. No.: 09/646,311

(22) PCT Filed: Mar. 17, 1999

(86) PCT No.: PCT/EP99/01755

§ 371 Date: Oct. 18, 2000

§ 102(e) Date: Oct. 18, 2000

(87) PCT Pub. No.: WO99/47586

PCT Pub. Date: Sep. 23, 1999

(30) Foreign Application Priority Data

Mar. 19, 1998 (EP) .............................................. 98105004

(51) Int. Cl.⁷ .............................. C03G 9/00; C08K 5/00

(52) U.S. Cl. ........................ 430/111; 528/287; 528/295; 528/298; 528/300; 528/302; 528/307; 528/308; 528/308.6; 528/491; 528/503; 524/81; 524/474; 524/801; 524/845; 524/904; 524/908

(58) Field of Search ................................. 528/287, 295, 528/298, 300, 302, 307, 308, 308.6, 491, 503; 524/81, 474, 801, 845, 904, 908; 430/111

(56) References Cited

U.S. PATENT DOCUMENTS

| 3,925,295 A | | 12/1975 | Osborn et al. ............. 260/34.2 |
| 5,780,196 A | * | 7/1998 | Fujiwara et al. ............ 430/137 |
| 5,837,754 A | * | 11/1998 | Shimomura et al. ........ 523/161 |

FOREIGN PATENT DOCUMENTS

| EP | 0751166 | 6/1995 |

* cited by examiner

*Primary Examiner*—Samuel A. Acquah
(74) *Attorney, Agent, or Firm*—Connolly Bove Lodge & Hutz LLP

(57) ABSTRACT

The invention relates to a process for the production of spherical, polyester particles, wherein the particle size can be exactly adjusted in the range of 1 to 200 $\mu$m and a particle size distribution with a span (=d90–d10/d50)$\leq$1.5, as well as the use of the produced particles for toner compositions in electrophotographic and direct printing systems and powder coatings.

15 Claims, No Drawings

MANUFACTURING METHODS, BASED ON NON AQUEOUS DISPERSION TECHNIQUES, TO PRODUCE SPHERICAL POLYESTER PARTICLE SIZE DISTRIBUTIONS AND TAILORABLE MEAN PARTICLE SIZES

BACKGROUND OF THE INVENTION

The present invention relates to manufacturing processes used to make spherical polyester particles. The process can be exactly adjusted to pick a mean particle size anywhere in the range of from 1 to 200 μm, and can produce particles of very narrow particle size distribution. Particles made by this process have utility in a variety of applications, including applications as powder coatings and as particles suitable for application for toners and use in high resolution electrophotography.

Polymer particles are traditionally prepared by subjecting resin and additive components to intense mixing in an extruder at a temperature above the softening point of the film-forming polymer and then, by means of a milling process bringing the resulting extrudate to a particle form. For applications in powder coating, for example, irregularly shaped powders of particle sizes ranging from 20 to 100 μm are typically achieved. For applications as toners in electrophotography, powders with a mean particle size of from 7 to 20 μm are typically achieved. The milling process to make particles such as this has a number of deficiencies:
1. It leads to powders of irregular structure and broad particle size distribution,
2. It routinely produces significant amounts of oversized and undersized particles (fines), which can result in significant material loss and process expense due to sieving,
3. The irregular shape of the particles plus the broad particle size distribution can lead to less than ideal flow and charge behavior of the particles.
4. There is added expense associated with production of a finished resin and, in a separate step, conducting a milling or other particle generating operation.

To make toner particles suitable for high resolution laser printers and copy machines, for example, 1200 dot per inch resolution, it is necessary to have a particle with a size of 5 μm to meet these resolution requirements. Existing milling technology will make particles of this size only with considerable effort and waste, and the processing and economic problems mentioned above with irregular particle structure and broad particle size distribution are exacerbated as the size of the particle is reduced.

The breadth of a particle size distribution is characterized using not only the parameter $d_{50}$, for which just 50% of the particles are greater than or smaller than the value $d_{50}$, but also two further parameters: $d_{10}$ designates the particle size for which 10% of the particles are smaller than this value. Correspondingly, $d_{90}$ designates the particle size for which 90% of the particles are finer than the value $d_{90}$. To characterize the breadth of a particle size distribution it is usual to form a quotient which is referred to as the span and is calculated in accordance with the following formula: span= $(d_{90}-d_{10})/d_{50}$. The relationship is thus: the smaller the span the narrower the particle size distribution. A powder comprising spheres identical in size would have a span of 0. For milled powders with a mean particle size $d_{50}$ of 50 μm, for example, a span of 3–4 is typically obtained.

It is also desirable, on the basis of economic considerations, to have processes for the manufacture of polymer particles which start with either monomeric components or oligomeric components, in which the polymer and the powder are produced in one process step. A process such as this which would produce a powder with the desired average particle size ($d_{50}$) with a narrow particle size distribution would be of even greater advantage. Some of the advantages would be a reduction in manufacturing cost (via combination of the polymerization and powder production steps, a reduction in the amount of waste, improvement in process yield, reduction in process time and improvement in energy efficiency.

There have been no lack of efforts to develop alternative methods for powder production by means of new technologies without incurring the above mentioned disadvantages in proccessability. The aim is, in general, to prepare particles with a near-ideal spherical form, since such powders exhibit substantially more favorable flow behavior than the irregular milled powders. It has been attempted, for example, to prepare near-spherical particles by spraying polymer melts. The results presented in WO 92/00342 indicated, however, that this leads only to moderate success. The particles obtained by this technique, although having a smoother surface than milled powders, are still far removed from the ideal structure of the sphere.

Another method which has been investigated for the preparation of spherical particles is the spraying of polymers from a supercritical solution, as described, for example, in EP-A-0 661 091 or EP-A-0 792 999. This method too has substantial disadvantages. For example, in the cited applications it is stated that owing to the sudden evaporation of the supercritical "solvent", a powder is obtained which has a porous structure. When these powders are employed to prepare films there is—in comparison with nonporous powders, an increased occurrence of bubble formation and thus of defects in the coating, since the porous structure means that a large amount of gas is trapped in the powder and must be removed in the process of film formation. The use of supercritical solvents, moreover is technically complex since. for example, it requires operation under high pressure.

A method of producing spherical particles which differs in its principle is to produce a dispersion. Physical laws dictate that, in a dispersion, the perfect spherical form is the preferred geometry of the particles obtained. There has therefore been no lack of attempts in the past to obtain polymer particles which can be used, for example, as binders in coating systems, by preparing them in dispersion. (Keith Barett, Dispersion Polymerization in Organic Media, John Wiley and Sons, London, 1975). GB-1 373 531, for example, describes the preparation of stable dispersions of polycondensation polymers, such as polyesters.

The possibility of using the polymer particles from non-aqueous dispersion processes, based in particular on polyesters, as a powder coating is addressed in DE-C-21 52 515. Here, an existing polymer is brought into dispersion at a temperature <200° C. and, by addition pigments, in some cases at room temperature, a coloration is achieved. However, the resulting particles are described as substantially spherical "aggregates" of primary polymer particles and pigment particles. The isolation of material by spray drying leads to apparently to relatively large structures which it was necessary to convert back into a fine powder by mechanical means. Following the breaking up of the initially formed agglomerates, the stated particle size range is from about 2 to 50 μm, although there is no information whatsoever about the mean particle size or the particle size distribution.

The use, as described in DE-C-21 52 515, of a polymer which has already been condensed to high molecular weights as a starting product for dispersion preparation, moreover, has the following disadvantages: the already considerable viscosity of the polymers makes it difficult to achieve good division of the melt and to obtain a homogeneous particle size distribution.

U.S. Pat. No. 5,312,704 describes a toner composition comprised of pigment particles, and a resin comprised of a monomodal polymer resin or blends. This still suffers from issues described above in the extrusion blending followed by milling process, plus the dispersity of pigment particles as opposed to dyes. U.S. Pat. Nos. 5,660,963, and 5,556,732 all describe polyester resins blended with colorants in a melt extruder, followed by milling.

U.S. Pat. No. 5,346,798 describes a suspension polymerization method to make toner particles. This is .an aqueous dispersion method used to make addition polymers, and is not applicable to the non-aqueous dispersion method described here to make condensation polymer particles.

U.S. Pat. No. 5,621,055 describes a process for producing polymer particles with irregular shapes using a water soluble monomer in a system with a hydrophobic organic solvent, an aqueous solution of the water soluble monomer, and an anionic surfactant.

Accordingly, it is an object of this invention to provide for a manufacturing process to make spherical polyester particles of narrow particle size distribution in one step from either a mixture of monomers or a mixture of oligoesters. The process can be exactly adjusted to pick a mean particle size anywhere in the range of from 1 to 200 $\mu$m, and can produce particles of very narrow particle size distribution. Particles made by this process have utility in a variety of applications, including applications as powder coatings and as particles suitable for application for toners and use in high resolution electophotography.

Other objects and advantages of the present invention shall become apparent from the accompanying description and examples.

DESCRIPTION OF THE INVENTION

The present invention achieves this object and provides a process for the production of spherical, non-porous polyester particles which have a mean particle size of between 1 and 200 $\mu$m, and a particle size distribution ($d_{90}$–$d_{10}$/$d_{50}$) <1.5, preferably<1.2 which can be used for a variety of applications such as powder coatings, binder systems, adhesives, toners and use in electophotography.

The novel, spherical polyester particles are prepared by:
A. Producing a melt of the starting monomers or oligoesters for the polyester.
B. Slowly adding the molten starting material for the polyester to a rapidly stirred, inert high-boiling heat transfer medium at a temperature which is at least as high as the softening temperature of the starting materials, in the presence of at least one organic dispersion stabilizer, and
C. then heating the reaction mixture to a temperature in the range from 120–280° C., with simultaneous removal of the condensation byproducts, until the polyester has the desired molecular weight, and
D. subsequently and optionally, at a temperature of from 25 to 220° C. addition of additives, if desired, such as charge control agents or flow control agents, end capping reagents and crosslinkers, and
E. thereafter cooling reaction mixture to within the range which is below the softening temperature of the polyester and separating off the polyester powder, and washing off the residual heat transfer medium with an inert, volatile solvent which may be easily removed?in a drying step and drying of the resulting powder.

The dispersion can be dosed in relatively amounts from 0% to 100% either in the molten starting material or in the preheated heat transfer material in order to optimize the particle forming process.

The particle size is controlled by the nature of the polyester employed, the rate of stirring, and most importantly, the amount of organic dispersion stabilizer used and the method of dosing. The particle size distribution is controlled uniquely by the slow addition of the oligoester or monomer melt potentially containing a certain amount of the organic dispersion stabilizer to the heated, stirred solution of heat transfer medium that contains the residual dispersion stabilizer. In contrast, when a mixture of oligoester (or monomers), heat transfer medium and dispersion medium is combined in the cold (room temperature) state and then heated together with stirring, the particle size average ($d_{50}$) can still be controlled via the above parameters, but the particle size distribution is much larger.

In general the particle size is reduced in raising the stirrer speed. In doing so the span is slightly broadened simultaneously. To circumvent this it is possible to raise the content of the dispersion stabilizer which results also in a smaller average particle size and has only a minor effect on the particle size distribution.

The starting materials employed are preferably oligoesters having viscosity of less than 1000 mPas (measured at 200° C.), in particular<500 mPas, which comprise units of the following formulae:

70 to 100 mol % of structural groups of formula —CO—A1—CO— (1)

0 to 30 mol % of structural groups of the formula —CO—A2—CO— (2)

0 to 50 mol % of structural groups of the formula —O—A3—CO— (3)

0.1 to 10 mol % of structural groups of the formula —CO—A4—CO— (4), preferably 1 to 5 mol %, more preferably 3 mol %.

and diol structural groups of the formula —O—D1—O— (5), O—D2—O— (6), and O—D3—O— (7) in which
A1 is 1,4-phenylene-, 2,6-naphthylene- or 4,4'-biphenylene radicals, which can be present individually or in any desired mixture,
A2 is aromatic radicals other than A1 or araliphatic radicals having 5 to 16, preferably 6 to 12, carbon atoms or cyclic or acyclic aliphatic radicals having 2 to 10 carbon atoms, preferably 4 to 8 carbon atoms.
A3 is aromatic radicals having 5 to 12, preferably 6 to 10, carbon atoms,
A4 is aromatic radicals having an anionic substituent, such as sulfonate, phosphonate, etc.
D1 is alkylene or polymethylene groups having 2 to 4 carbon atoms or cycloalkane or dimethylenecycioalkane groups having 6 to 10 carbon atoms and,
D2 is alkylene or polymethylene groups having 3 to 4 carbon atoms or cycloalkane or dimethylenecycloalkane groups having 6 to 10 carbon atoms other than D1, or bis-phenol A type moieties, or straight-chain or branched alkanediyl groups having 3 to 15, preferably 4 to 8, carbon atoms or radicals of the formula —(C2H4—O)m—C2H4—, in which m is an integer from 1 to 40, where m is preferably 1 or 2 for contents of up to 20 mol % and groups where m=10 to 40 are preferably present only in contents of less than 5 mol %.
D3 is alkylene or polymethylene groups having 2 to 4 carbon atoms or cycloalkane or dimethylenecycloalkane groups having 6 to 10 carbon atoms, or straight-chain or branched alkanediyl groups having 3 to 15, preferably 4 to 8, carbon atoms or radicals of the formula —(C2H4—O)m—C2H4—, in which m is an integer from 1 to 40, where m is preferably 1 or 2 for contents of up to 20 mol % and groups where m=10 to 40 are preferably present only in contents of less than 5 mol %. These groups have an anionic substituent, for example sulfonate, phosphonate.

The aromatic radicals A2 and A3 in their turn can also carry one or two substituents. Preferably, substituted radicals A2 and A3 carry only one substituent. Particularly suitable substituents are alkyi having 1 to 4 carbon atoms, alkoxy having 1 to 4 carbon atoms, and halide, such as chlorine.

Preferably, in accordance with the above statement, the dicarboxylic acid-diol precondensate employed as the starting material for the specific embodiment of the process according to the invention is a reaction product of one or more dicarboxylic acids of the formula HOOC—A1—COOH and one or more dicarboxylic acids of the formula HOOC—A4—COOH and, if appropriate, one or more dicarboxylic acids of the formula HOOC—A2—COOH or hydroxycarboxylic acids of the formula HO—A3—COOH. or functional derivatives of such di- or hydroxycarboxylic acids with one or more diols of the formula HO—D1—OH, and if appropriate one or more dials of the formula HO—D2—OH, in which, in addition to the esters formed from the starting materials, lower polycondensation products (oligomers) and as a rule small amounts of the starting materials are present.

Less preferably, in accordance with the above statement, the dicarboxylic acid-diol precondensate employed as the starting material for the specific embodiment of the process according to the invention is a reaction product of one or more dicarboxytic acids of the formula HOOC—A1—COOH and, if appropriate, one or more dicarboxylic acids of the formula HOOC—A2—COOH or hydroxycarboxylic acids of the formula HO—A3—COOH or functional derivatives of such di- or hydroxycarboxylic acids with one or more diols of the formula HO—D1—OH and HO—D3—OH, and if appropriate one or more diols of the formula HO—D2—OH, in which, in addition to the esters formed from the starting materials, lower polycondensation products (oligomers) and as a rule small amounts of the starting materials are present.

It is preferred first of all to prepare oligoesters of the above described composition in the melt by heating the carboxylic acid components, such as terephthalic, isophthalic, or 5-sulfonyl isophthalic acid, to name just a few, in the form of the free acid or as low molecular mass alkyl esters, together with the diol components, for example ethylene glycol, 1,2-propanediol, 2-methyl-1,3-propanediol, neopentylglycol or bis-hydroxvmethylcyclohexane, in the melt in the presence of a transesterification catalyst, such as compounds of manganese, zinc, tin, antimon or titanium, until the majority of the condensation products water or the lower alkanols, respectively, have been distilled off. In the course of this operation, however, no significant increase is observed in the viscosity of the melt. At 200° C., the viscosity is still <1000 mPas.

It is also possible to make the above oligoesters in the presence of additives such as charge control agents or flow control agents, which are admixed to the monomer mixture before the melt condensation.

An oligomer mixture of this kind can be converted, for example, into a novel dispersion directly at elevated temperature by combination with heat transfer oil and dispersant contained in the oil and/or in the oligomer mixture. This combination may be made preferably by addition of the molten precondensate to a mixture of preheated heat transfer oil and dispersant to give the narrowest particle size distribution. However, it is possible to cool the oligomer mixture for the purpose of storage, which would then be heated and melted before mixing with the heat transfer medium containing dispersant.

In addition, the oligomer mixture can be combined with heat transfer medium and/or dispersant in the cold state, then heated with stirring to conduct the dispersion polymerization reaction.

Less preferably, it is also possible to carry out the preparation of the oligomers in the actual dispersion, meaning the reaction can be conducted starting from monomers, without going through the initial melt-condensation to form the above oligoesters.

In a practical embodiment of the novel process the starting materials, preferably as an oligomer mixture, are added in step (a) in the molten state to a heated, stirred mixture of an inert, high boiling heat transfer medium and at least one organic dispersion stabilizer or dispersion stabilizer mixture. The mixture is heated to a temperature which must lie above the softening temperature of the starting materials, judiciously in the range of from 150 to 280° C.

Heat transfer media (dispersion media) which have proven particularly appropriate are aliphatic heat transfer oils having a boiling point in the range above 140 to 380° C. Such heat transfer oils are preferably, in the technical sense, free from aromatic structural groups: in other words, they contain not more than 2% by weight, more preferably not more than 1% by weight, of aromatic constituents.

Owing to the low polarity of these oils, which are marketed, for example, by Exxon Chemical under the trade names ®Isopar, ®Exxol, or ®Norpar, the polyesters are essentially not swollen. This is a problem which occurs in some cases for aromatic oils, which in principle are equally suitable for the dispersion process.

General rules for the design of appropriate polymeric dispersion stabilizers are given by Keith Barett in "Dispersion Polymerization in Organic Media", John Wiley and Sons, London, 1975 on pages 45 to 110. Principal requirements are solubility of the polymeric dispersion stabilizer in the dispersion medium used, and polar or reactive groups which allow strong interaction with the particles that are to be dispersed.

For the novel process it is preferred to employ amphiphilic copolymers, preferably organic copolymers, or surface-modified inorganic compounds. Examples of the later are phyllosilicates surfaced-modified with trialkytammonium salts, especially bentonite surface-modified with tralkylammonium salts, or amphiphilic copolymers comprising a polar polymer unit for example poly-N-vinyl pyrrolidone, and an apolar polymer unit, for example long-chain α-olefins such as 1-eicosene.

Such amphiphilic copolymers are marketed by the company ISP Global under the tradename ®Antaron and have been found particularly appropriate. As described, for example, in EP-B-0 392 285. Antaron has already been employed successfully at relatively low temperatures for stabilizing polyurethane dispersions. It has been found that Antaron can be also employed with advantage, however, at temperatures up to 300° C. and results in excellent stability of the dispersions.

The content of the dispersion stabilizer is, in accordance with the invention, in the range from 0.1 to 6% by weight based on the polyester, preferably in the range of from 0.3 to 4% by weight and, in particular, in the range of from 0.5 to 3% by weight in order to obtain particles having the desired size.

In a subsequent step (b) the reaction mixture is heated further to a temperature in the range of from 120 to 280° C. in particular from 200 to 250° C., with the resulting condensation byproducts being removed in parallel. The temperature is maintained until the polyester has reached the desired molecular weight, which is usually in the range of Mn=1000 to 20,000, preferably in the range of 2000 to 10,000. Of decisive importance for the molecular weight is the duration of the reaction, which can be monitored by taking samples.

Following the conclusion of the condensation in step (b), it is also possible, in order to optimize the charge behavior of the toner particle or the coating properties of the polyester—as is desirable for optimum surface quality or transparency—to add additives such as charge control agents, flow assistants or devolatilization assistants, for example. This is done by cooling the mixture to 25 to 200° C. and adding the desired additives at the same time as stirring the reaction mixture. These additives can be added as described above without impacting negatively on the dispersion stability or particle formulation.

The temperature of the reaction mixture is reduced to a temperature which is below the softening temperature of the polyester, preferably <60° C. In this process the polyester is obtained in powder form. The resulting colorless, spherical polyester particles are separated off from the supernatant reaction solution, washed with a volatile, aliphatic hydrocarbon, such as hexane, isohexane, cyclohexane, pentane or butane, to remove excess heat transfer oil, then dried, preferably in a vacuum tumble dryer, at a temperature below the softening point of the polyester.

The polyester particles obtained in the process described are transparent and can be prepared with any desired molecular weight, for example in the range of from Mn=1000 to Mn=20,000, but/even as high as Mn=50,000. The yield is >95%, in general even greater than >98%, especially if the reaction is conducted on a relatively large scale. There are virtually no instances of adhesion in the reactor which could lead to a reduction in yield.

By means of the novel process it is possible to obtain spherical polyester particles having a mean particle size ($d_{50}$) of from 1 to 200 µm, and a particle size distribution ($d_{90}-d_{10}$)/$d_{50}$ of <1.5, in particular <1.2 and preferably ≦1.0.

Because of their tailorable size the polyester particles produced according to the instant process are particularly suited for the use in a number of applications. Particles with small sizes may be employed for instance for toners, use in electophotography, while particles with larger sizes, in the range of 20 to 50 µm are useful for the production of powder coatings.

EXAMPLES

Characterization

Inherent Viscosity:
Measured at 25° C. under 2.0% concentration (weight/volume) in N-methyl pyrrolidone containing 0.06% of lithium bromide.

Particle size:
Either dried powder or as-polymerized dispersion was well mixed with Heptane by ultrasonic then evaluated with laser light scattering method using a Malvern Mastersizer® at room temperature.

Glass transition temperature:
Evaluated on the second heating profile with a differential scanning calorimeter (DSC) using 10° C./min. heating rate.

Residual oil in dried powder:
Dried powder was dissolved into organic solvent, e.g. methylene chloride, then measured with gas chromatography. A peak caused by residual oil was calibrated with internal standard.

Residual washing solvent:
Evaluated by thermal gravity analysis (TGA) heating from 35° C. to 300° C. with 10° C./min. under nitrogen. Weight loss at 150° C. from 50° C. was calculated as an amount of residual solvent.

Example 1

NAD Polymerization from Precondensate with 50% Antaron in the Precondensate and 50% Antaron in the Heat Transfer Oil Into an 250 liter stainless steel reactor equipped with an agitator and a packed column was added dimethyl terephthalate (161.9 Kg), dimethyl-5-sulfonyl isophthalate sodium salt (7.6 Kg), ethylene glycol (64.0 Kg), 2-methyl-1,3-propandiol (23.2 Kg), and dibuthyltinoxide (52.5 gram). The mixture was heated up to 150° C. and held for 30 minutes under nitrogen blanket then heated again to 200° C. in 270 minutes with removing methanol which was the byproduct from the ester inter-exchange reaction between dimethylester and diols. Kept at the temperature for 90 minutes to get 31.4 Kg of distillate. The mixture was cooled down to 150° C. and discharged from the reactor and cooled further. About 200 Kg of waxy white solid obtained (Precondensate A).

Into a 1.5 liter stainless steel main reactor equipped with a 6-blade-type agitator was added isoparaffinic oils, Isopar® P (150 gram) and Isopar® L (300 gram) provided by Exxon Chemical Europe Inc., and vinylpyrrolidone copolymer. Antaron® V220 (6.75 gram) provided by ISP. They were held at 190° C.

A 518.6 gram of solid Precondensate A was weighted in a upper 1.5 liter stainless steel reactor together with Antaron® (6.75 gram) and heated up to 190° C. It melted above 140° C. and became water-like thin liquid at 190° C.

The molted Antaron containing Precondensate A was slowly added into the 1.5 liter reactor containing oils and Antaron within 7 minutes under high-speed stirring (1000 rpm) through a preheated metal tube with a control valve. The molten precondensate reached directly to the oil-surface. The resulting dispersion was kept for another 10 minutes at 190° C.

Then the dispersion was heated up to 210° C. in 30 minutes under nitrogen flow of 25 liter per hour and the constant stirring. The isoparaffinic oil which was a dispersion medium in this stage began to boil at 194° C. The vapor was introduced into a phase-separator through a water-cooler where the distilled ethylene glycol was separated from the oil. The phase-separator held ca. 10 ml of the distilled oil and the rest returned to the dispersion from the top of the reactor through the glass tube where the running oil touched the vapor mixture. The dispersion was kept at 210° C. for 120 minutes removing ethylene glycol. A 57.3 gram of distillate was finally collected through the phase-separator. Then the dispersion was cooled down to ambient temperature and discharged.

The dispersion was filtered with polyester taffeta with pore size of about 40 micron. The filtered powder cake was washed three times with a 900 ml of iso-hexane then dried at 40° C. under vacuum overnight A 440 gram of fine white powder was obtained with a particle size (volume-average size), 11 micron, span 1.18 and I.V., 0.11 dl/g. The dried powder contained 1.6% of residual oil and 1.0% of isohexane.

Example 2

NAD Polymerization from Precondensate with 100% Antaron in the Precondensate

Into an 250 liter stainless steel reactor equipped with an agitator and a packed column was added dimethyl terephthalate (161.9 Kg), dimethyl-5-sulfonyl isophthalate sodium salt (7.6 Kg), ethylene glycol (64.0 Kg), 2-methyl-1,3-propandiol (23.2 Kg), and dibuthyltinoxide (52.5 gram). The mixture was heated up to 150° C. and held for 30 minutes under nitrogen blanket then heated again to 200° C. in 270 minutes with removing methanol which was the byproduct from the ester inter-exchange reaction between dimethylester and diols. Kept at the temperature for 90 minutes to get 31.4 Kg of distillate. The mixture was cooled down to 150° C. and discharged from the reactor and cooled further. About 200 Kg of waxy white solid obtained (Precondensate A).

Into a 1.5 liter stainless steel main reactor equipped with a 6-blade-type agitator was added isoparaffinic oils, Isopar® P (150 gram) and Isopar® L (300 gram) provided by Exxon Chemical Europe Inc. They were held at 190° C.

A 518.6 gram of solid Precondensate A was weighted in a upper 1.5 liter stainless steel reactor together with Antaron® (13.5 gram) and heated up to 190° C. It melted above 140° C. and became water-like thin liquid at 190° C.

The molted Precondensate A containing Antaron was slowly added into the 1.5 liter reactor within 7 minutes under high-speed stirring (1000 rpm) through a preheated metal tube with a control valve. The molten precondensate reached directly to the oil-surface. The resulting dispersion was kept for another 10 minutes at 190° C. Then the dispersion was heated up to 210° C. in 30 minutes under nitrogen flow of 25 liter per hour and the constant stirring. The isoparaffinic oil which was a dispersion medium in this stage began to boil at 194° C. The vapor was introduced into a phase-separator through a water-cooler where the distilled ethylene glycol was separated from the oil. The phase-separator held ca. 10 ml of the distilled oil and the rest returned to the dispersion from the top of the reactor through the glass tube where the running oil touched the vapor mixture. The dispersion was kept at 210° C. for 120 minutes removing ethylene glycol. A 48.2 gram of distillate was finally collected through the phase-separator. Then the dispersion was cooled down to ambient temperature and discharged.

The dispersion was filtered with polyester taffeta with pore size of about 40 micron. The filtered powder cake was washed three times with a 900 ml of iso-hexane then dried at 40° C. under vacuum overnight. A 459 gram of fine white powder was obtained with a particle size (volume-average size), 8 micron, span 1.42 and I.V., 0.08 dl/g. The dried powder contained 2.7% of residual oil and 1.6% of isohexane.

Example 3

NAD Polymerization from Precondensate with 100% Antaron in the Heat Transfer Oil Into an 250 liter stainless steel reactor equipped with an agitator and a packed column was added dimethyl terephthalate (161.9 Kg), dimethyl-5-sulfonyl isophthalate sodium salt (7.6 Kg), ethylene glycol (64.0 Kg), 2-methyl-1,3-propandiol (23.2 Kg), and dibuthyltinoxide (52.5 gram). The mixture was heated up to 150° C. and held for 30 minutes under nitrogen blanket then heated again to 200° C. in 270 minutes with removing methanol which was the byproduct from the ester inter-exchange reaction between dimethylester and diols. Kept at the temperature for 90 minutes to get 31.4 Kg of distillate. The mixture was cooled down to 150° C. and discharged from the reactor and cooled further. About 200 Kg of waxy white solid obtained (Precondensate A).

Into a 1.5 liter stainless steel main reactor equipped with a 6-blade-type agitator was added isoparaffinic oils, Isopar® P (150 gram) and Isopar® L (300 gram) provided by Exxon Chemical Europe Inc. together with Antaron® (13.5 gram). They were held at 190° C.

A 518.6 gram of solid Precondensate A was weighted in a upper 1.5 liter stainless steel reactor and heated up to 190° C. It melted above 140° C. and became water-like thin liquid at 190° C.

The molted Precondensate A was slowly added into the 1.5 liter reactor within 7 minutes under high-speed stirring (1000 rpm) through a preheated metal tube with a control valve. The molten precondensate reached directly to the oil-surface. The resulting dispersion was kept for another 10 minutes at 190° C.

Then the dispersion was heated up to 210° C. in 30 minutes under nitrogen flow of 25 liter per hour and the constant stirring. The isoparaffinic oil which was a dispersion medium in this stage began to boil at 194° C. The vapor was introduced into a phase-separator through a water-cooler where the distilled ethylene glycol was separated from the oil. The phaseseparator held ca. 10 ml of the distilled oil and the rest returned to the dispersion from the top of the reactor through the glass tube where the running oil touched the vapor mixture. The dispersion was kept at 210 ° C. for 120 minutes removing ethylene glycol. A 48.2 gram of distillate was finally collected through the phase-separator. Then the dispersion was cooled down to ambient temperature and discharged.

The dispersion was filtered with polyester taffeta with pore size of about 40 micron. The filtered powder cake was washed three times with a 900 ml of iso-hexane then dried at 40° C. under vacuum overnight. A 390 gram of fine white powder was obtained with a particle size (volume-averagesize), 6.8 micron, span 1.6 and I.V., 0.18 dl/g. The dried powder contained 3.6% of residual oil and 1.6% of isohexane.

Example 4

Up-scaled NAD Polymerization from Precondensate with 100% Antaron in the Heat Transfer Oil Into an 250 liter stainless steel reactor equipped with an agitator and a packed column was added dimethyl terephthalate (161.9 Kg), dimethyl-5-sulfonyl isophthalate sodium salt (7.6 Kg), ethylene glycol (64.0 Kg), 2-methyl-1,3-propandiol (23.2 Kg), and dibuthyltinoxide (52.5 gram). The mixture was heated up to 150° C. and held for 30 minutes under nitrogen blanket then heated again to 200° C. in 270 minutes with removing methanol which was the byproduct from the ester inter-exchange reaction between dimethylester and diols. Kept at the temperature for 90 minutes to get 31.4 Kg of distillate. The mixture was cooled down to 150° C. and discharged from the reactor and cooled further. About 200 Kg of waxy white solid obtained (Precondensate A).

Into a 100 liter stainless steel main reactor equipped with a 4blade-type agitator was added isoparaffinic oils. Isopar® P (11 kg) and Isopar® L (22 kg) provided by Exxon Chemical Europe Inc. together with Antaron® (695 g). They were held at 190° C.

A 35 kg of solid Precondensate A was weighted in a upper 60 liter stainless steel reactor and heated up to 190° C. It melted above 140° C. and became water-like thin liquid at 190° C.

The molted Precondensate A was slowly added into the 100 liter reactor within 7 minutes under high-speed stirring (1000 rpm) through a preheated metal tube with a control valve. The molten precondensate reached directly to the oil-surface. The resulting dispersion was kept for another 10 minutes at 190° C.

Then the dispersion was heated up to 210° C. in 2.5 hours under nitrogen flow of 250 liter per hour and the constant stirring. The isoparaffinic oil which was a dispersion medium in this stage began to boil at 194° C. The vapor was introduced into a phase-separator through a water-cooler where the distilled ethylene glycol was separated from the oil. The phase-separator held ca. 1.5 l of the distilled oil and the rest returned to the dispersion from the top of the reactor through the glass tube where the running oil touched the vapor mixture. The dispersion was kept at 210° C. for 3 hours removing ethylene glycol. A 5 kg of distillate was finally collected through the phase-separator. Then the dispersion was cooled down to ambient temperature and discharged.

The dispersion was filtered with polyester taffeta with pore size of about 40 micron. The filtered powder cake was washed with iso-hexane then dried at 40° C. under vacuum. A 31 kg of fine white powder was obtained with a particle size (volume-average size), 4.9 micron, span 1.2 and I.V., 0.22 dl/g. The dried powder contained 3% of residual oil.

Example 5

NAD Polymerization from Monomers with 100% Antaron in the Heat Transfer Oil

Into an 1.5 liter stainless steel reactor equipped with an agitator and a packed column was added dimethyl terephthalate (208.8 g), dimethyl isophthalate (196.3 g), dimethyl-5-sulfonyl isophthalate sodium salt (19.1 g), 1,2-propanediol (245.5 g) and dibuthyltinoxide (0.270 g). The mixture was heated up to 150° C. and held for 30 minutes under nitrogen blanket then heated again to 220° C. in 5 hours with removing methanol which was the byproduct from the ester inter-exchange reaction between dimethylester and diols. Kept at the temperature for 90 minutes to get 128 g of distillate. The temperature is then reduced to 190° C. The mixture was then directly discharged into the NAD reactor.

Into a 1.5 liter stainless steel main reactor equipped with a 6-blade-type agitator was added isoparaffinic oils, Isopar® P (150 gram) and Isopar® L (300 gram) provided by Exxon Chemical Europe Inc. together with Antaron® (18 gram). They were held at 190° C.

The resulting portion of precondensate was slowly added as a waterlike thin liquid into the 1.5 liter reactor within 7 minutes under high-speed stirring (1000 rpm) through a preheated metal tube with a control valve. The molten precondensate reached directly to the oil-surface. The resulting dispersion was kept for another 10 minutes at 190° C.

Then the dispersion was heated up to 210° C. in 30 minutes under nitrogen flow of 25 liter per hour and the constant stirring. The isoparaffinic oil which was a dispersion medium in this stage began to boil at 194° C. The vapor was introduced into a phase-separator through a water-cooler where the distilled ethylene glycol was separated from the oil. The phase-separator held ca. 10 ml of the distilled oil and the rest returned to the dispersion from the top of the reactor through the glass tube where the running oil touched the vapor mixture. The dispersion was kept at 210° C. for 4.5 hours removing ethylene glycol. A 50 g of distillate was finally collected through the phaseseparator. Then the dispersion was cooled down to ambient temperature and discharged.

The dispersion was filtered with polyester taffeta with pore size of about 40 micron. The filtered powder cake was washed three times with a 900 ml of iso-hexane then dried at 40° C. under vacuum overnight. A 490 g of fine white powder was obtained with a particle size (volume-average size), 6.4 micron, span 0.8 and I.V., 0.20 l/g. The dried powder contained 3.5% of residual oil and 1% of isohexane.

Example 6

NAD Polymerization 250 g of molten precondensate (containing 8.5 mol % isopthalic acid, 37.5% terephthalic acid and 54 mol % neopentytgiycole) were added to a mixture of isoparaffinic oils (Isopar® L (125 gram) and Isopar® P (125 gram) provided by Exxon Chemical Europe Inc.) together with Antaron® (3.75 gram) in a 1.5 liter stainless steel main reactor equipped with a 6-blade-type agitator at 190° C. and stirred at 1800 rpm. Nitrogen flow was held at 25 l/h.

0.03 g of dibutyltinoxide were added and the mixture was heated to 217° C. within 20 minutes. Distillation of condensation products continued for 135 minutes. Then, the dispersion was cooled down to ambient temperature and discharged.

A sample of the powder dispersed in oil was used for determination of particle size distribution.

The dispersion was filtered with polyester taffeta with pore size of about 40 micron. After filtration, the powder was washed three times with 600 ml of isohexane and dried at 40° C. under vacuum of 200 mbar overnight.

250 g of fine white powder was obtained with a average diameter of 21 µm, a span of 1.0 and an inherent viscosity of 9.7 ml/g.

Examples 7 to 12

NAD Polymerisation

Procedure of NAD polymerisation according to Example 6.

TABLE 1

| Ex. | Oil | average particle size (diameter) [µm] | span |
|---|---|---|---|
| 7 | Isopar L, 125 g<br>Isopar P, 125 g | 29 | 1.0 |
| 8 | Norpar 15, 250 g (Exxon) | 29 | 1.1 |
| 9 | Risella G05, 250 g (Shell) | 22 | 1.15 |
| 10 | Isopar L, 125 g<br>Isopar P, 125 g | 19 | 0.7 |
| 11 | Norpar 12, 156 g<br>Norpar 15, 94 g | 20 | 1.2 |
| 12 | Norpar 12, 156 g<br>Norpar 15, 94 g | 23 | 1.1 |

Comparative Example 1 NAD Polymerisation 250 g of precondensate (containing 8.5 mol % isopthhalic acid, 37.5% terephthalic acid and 54 mol % neopentylglycole) were added to a mixture of isoparaffinic oils (Isopar® L (125 gram) and Isopar® P (125 gram) provided by Exxon Chemical Europe Inc.) together with Antaron® (3.75 gram) and 0.03 g of dibutyltinoxide in a 1.5 liter stainless steel main reactor equipped with a 6-blade-type agitator at ambient temperature. Nitrogen flow was held at 25 l/h. The mixture was heated up to 217° C. within 20 minutes and stirred at 1800 rpm.

Distillation of condensation products continued for 90 minutes. Then, the dispersion was cooled down to ambient temperature and discharged.

A sample of the powder dispersed in oil was used for determination of particle size distribution.

The dispersion was filtered with polyester taffeta with pore size of about 40 μm. After filtration, the powder was washed three times with 600 ml of isohexane and dried at 40° C. under vacuum of 200 mbar overnight.

250 g of fine white powder was obtained with a average diameter of 36 μm and a span of 1.55.

Comparative Example 2 NAD polymerisation

Procedure of NAD polymerisation according to Comparative Example 1.

250 g of fine white powder was obtained with a average diameter of 25 μm and a span of 1.6.

What is claimed is:

1. A process for preparing spherical, polyester particles having a mean particle size of between 1 to 200 μm and a particle size distribution with a span (=d90−d10/d50)<1.5, comprising the following steps:
   A. producing a melt of the starting monomers or oligoesters for polyester
   B. slowly adding the molten starring materials for the polyester to a rapidly stirred inert high-boiling heat transfer medium at a temperature which is at least as high as the softening temperature of the starting materials, in the presence of at least one polymeric dispersion stabilizer, and
   C. then heating of the reaction mixture to a temperature in the range from 120 to 280° C., with simultaneous removal of the condensation byproducts, until the polyester has the desired molecular weight;
   D. optionally subsequent addition additives, if desired, at a temperature in the range from 25 to 220° C.;
   E. thereafter cooling the reaction mixture to a temperature within a range which is below the softening temperature of the polyester and separating off of the resulting colorless spherical polyester particles and washing off the residual heat transfer medium with an inert, volatile solvent and drying of the resulting powder.

2. The process as claimed in claim 1, wherein as starting materials compounds are employed which comprise units of the following formulae
   70 to 100 mol % of structural groups of formula —CO—A1—CO— (1)
   0 to 30 mol % of structural groups of the formula —CO—A2—CO— (2)
   0 to 50 mol % of structural groups of the formula —O—A3—CO— (3)
   0.1 to 10 mol % of structural groups of the formula —CO—A4—CO— (4)
   and diol structural groups of the formula —O—D1—O— (5), O—D2—O— (6), and )—D3—O— (7) in which
   A1 is 1,4-phenylene-, 2,6-naphthylene- or 4,4'-biphenylene radicals, which can be present individually or in any desired mixture,
   A2 is aromatic radicals other than A1 or araliphatic radicals having 5 to 16 carbon atoms or cyclic or acyclic aliphatic radicals having 2 to 10 carbon atoms,
   A3 is aromatic radicals having 5 to 12 carbon atoms,
   A4 is aromatic radicals having an anionic substituent
   D1 is alkylene or polymethylene groups having 2 to 4 carbon atoms or cycloalkane or dimethylenecycloalkane groups having 6 to 10 carbon atoms and,
   D2 is alkylene or polymethylene groups having 3 to 4 carbon atoms or cycloalkane or dimethylenecycloalkane groups having 6 to 10 carbon atoms other than D1, or bis-phenol A type moieties, or straight-chain or branched alkanediyl groups having 3 to 15, carbon atoms or radicals of the formula —(C2H4—O)m—C2H4—, in which m is an integer from 1 to 40,
   D3 is alkylene or polymethylene groups having 2 to 4 carbon atoms or cycloalkane or dimethylenecycloalkane groups having 6 to 10 carbon atoms, or straight-chain or branched alkanediyl groups having 3 to 15 carbon atoms or radicals of the formula —(C2H4—O)m—C2H4—, in which m is an integer from 1 to 40, and these groups can optionally have an anionic substituent.

3. The process as claimed in claim 1, wherein the oligoesters are added to the heat transfer medium in step B.

4. The process as claimed in claim 1, wherein the heat transfer medium used has a boiling point in the range from 140 to 380° C.

5. The process as claimed in claim 1, wherein an organic amphiphilic copolymer is employed as sad dispersion stabilizer.

6. The process as claimed in claim 1, wherein the content of the dispersion stabilizer is in the range from 0.1 to 6% by weight, based on the polyester.

7. The process as claimed in claim 1, wherein the polyesters obtained have a molecular weight Mn in the range from 1000 to 20,000.

8. The process as claimed in claim 1, wherein the polyester particles obtained have a particle size distribution with a span (d90−d10/d50) of <1.2.

9. Polyester particles obtained by the process according to claim 1.

10. Polyester particles according to claim 9 for the application in toner compositions in electrophotographic, and direct printing systems and powder coatings.

11. The process as claimed in claim 2, wherein 1 to 5 mol % of formula (4) is present and
   A2 is aromatic radicals other than A1 or araliphatic radicals having 6 to 12 carbon atoms or cyclic or acyclic aliphatic radicals having 4 to 8 carbon atoms,
   A3 is aromatic radicals having 6 to 10 carbon atoms,
   A4 is aromatic radicals having a sulfonate or phosphonate substituent,
   D2 is alkylene or polymethylene groups having 3 to 4 carbon atoms or cycloalkane or dimethylenecycloalkane groups having 6 to 10 carbon atoms other than D1, or bis-phenol A type moieties, or straight-chain or branched alkanediyl groups having 4 to 8 carbon atoms or radicals of the formula —(C2H4—O)m—C2H4—, in which m is 1 or 2 for contents of up to 20 mol % and groups where m is 10 to 40 are present only in contents of less than 5 mol %.
   D3 is alkylene or polymethylene groups having 2 to 4 carbon atoms or cycloalkane or dimethylenecycloalkane groups having 6 to 10 carbon atoms, or straight-chain or branched alkanediyl groups having 4 to 8 carbon atoms or radicals of the formula —(C2H4—O)m—C2H4—, in which m is 1 or 2 for contents of up to 20 mol % and groups where m is 10 to 40 are present only in contents of less than 5 mol % and these groups can have sulfonate or phosphonate substituent.

12. The process as claimed in claim 11, wherein 3 mol % of formula (4) is present.

13. The process as claimed in claim 12 wherein the oligoesters are added to the heat transfer medium in step B and the heat transfer medium used has a boiling point in the range from 140 to 380° C.

14. The process as claimed in claim 13, wherein an organic amphiphilic copolymer is employed as said dispersion stabilizer.

15. The process as claimed in claim 14, wherein the content of the dispersion stabilizer is in the range from 0.1 to 6% by weight, based on the polyester and the polyesters obtained have a molecular weight Mn in the range from 1000 to 20,000 and a particle size distribution with a span (d90–d10/d50) of <1.2.

* * * * *

UNITED STATES PATENT AND TRADEMARK OFFICE
CERTIFICATE OF CORRECTION

PATENT NO.     : 6,365,315 B1
DATED          : April 2, 2002
INVENTOR(S)    : Wulf et al.

It is certified that error appears in the above-identified patent and that said Letters Patent is hereby corrected as shown below:

<u>Column 14,</u>
Line 31, delete "sad" and insert -- said --.

Signed and Sealed this

Second Day of July, 2002

*Attest:*

*Attesting Officer*

JAMES E. ROGAN
*Director of the United States Patent and Trademark Office*